Figure 1:
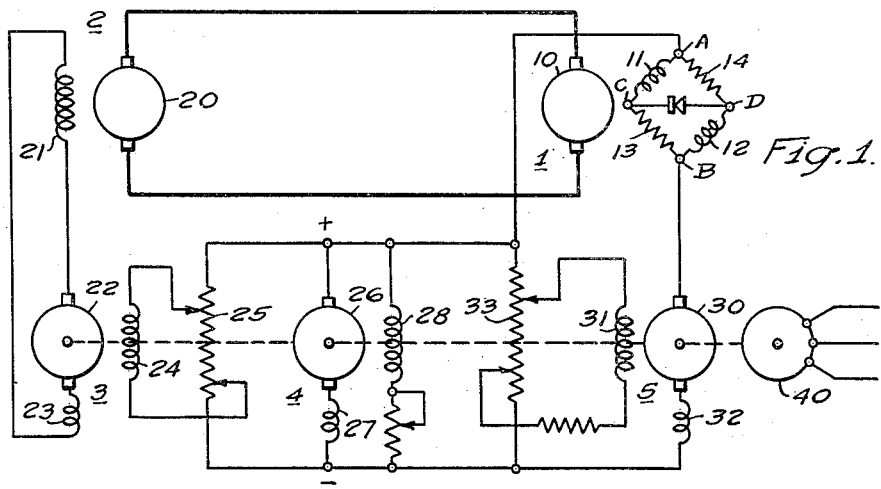

Feb. 21, 1950 — N. H. SHAW — 2,498,303

MOTOR CONTROL SYSTEM

Filed April 29, 1947

WITNESSES:

INVENTOR
Norman Harry Shaw.
BY
ATTORNEY

Patented Feb. 21, 1950

2,498,303

UNITED STATES PATENT OFFICE 2,498,303

MOTOR CONTROL SYSTEM

Norman Harry Shaw, Stafford, England, assignor to The English Electric Company Limited, London, England, a company of England Application April 29, 1947, Serial No. 744,713
In Great Britain July 11, 1945

Section 1, Public Law 690, August 8, 1946
Patent expires July 11, 1965

12 Claims. (Cl. 318—535)

This invention relates to direct current circuits containing inductive windings, and is concerned with arrangements which give to such circuits time constants which differ, at least under certain conditions, from the natural time constants of the inductive windings. Certain arrangements of this character are described in British patent specifications 528,789 and 14,346/44.

According to one feature of the present invention, there is provided a network comprising $n$ parallel paths, each containing one of $n$ equal sections into which an inductive winding is divided, and each being completed by resistors to the total value of $(n-1)$ times the resistance of each winding section, the network also comprising $(n-1)$ rectifiers each connected in the same sense substantially directly from the end of the winding section in one path to the beginning of the winding section in another path, the arrangement being such that when a constant direct voltage is applied to said network and the currents therein are constant, there is no voltage across and no current through any of the rectifiers. The expression "substantially directly" is intended not to exclude, for example, the series connection with the rectifier of an element such as a resistance which will not substantially alter the manner of functioning of the circuit.

According to another feature of the invention there is provided a bridge comprising an inductive winding divided into two equal sections arranged as one pair of opposite arms, a pair of resistors each having resistance equal to that of a winding section arranged as the other pair of opposite arms, a rectifier connected substantially directly between one pair of opposite corners of the bridge, and means to change a direct voltage applied between the other pair of corners.

Although applicable to inductive windings generally, the invention is particularly useful in its application to the field windings of dynamo-electric machines to give desired rates of change of field strength suitable for certain conditions of operation.

According to another feature of the invention, a Ward Leonard system comprises a direct-current generator and a direct-current motor, each having its field winding divided into two equal sections arranged as one pair of opposite arms of a bridge, each bridge being completed by two resistors having resistance values equal to those of the winding sections of that bridge, a generator exciter feeding the generator field bridge at one pair of opposite corners and having an exciter field winding connected across its other pair of corners in such sense as to increase the exciter E. M. F. when the currents in the generator field sections are increasing and to decrease the exciter E. M. F. when these currents are decreasing, a main exciter and a bucking exciter in series feeding the motor field bridge at one pair of opposite corners, the bucking exciter having a field winding connected across the other pair of corners of the motor field bridge in such sense as to increase in the bucking sense the E. M. F. of the exciter when the currents in the motor field sections are decreasing, and a rectifier connected substantially directly across said other pair of corners of the motor field bridge in such sense as to conduct when the currents in the motor field sections are increasing.

Figure 2:
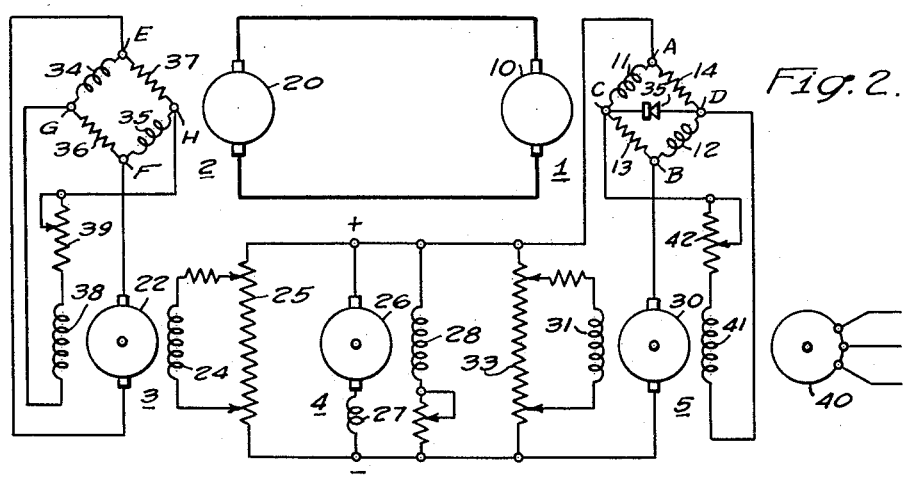
Figure 3:
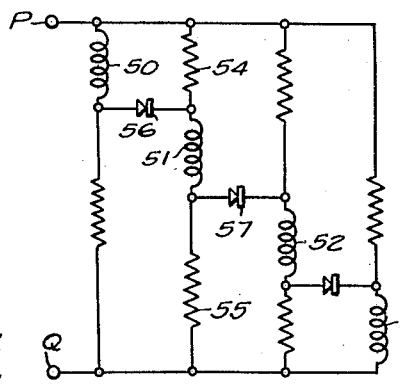

In the accompanying drawings, Figs. 1 and 2 show circuit diagrams of Ward Leonard systems in which the invention is applied, the arrangements being suitable for use in a reversing, steel rolling mill drive. Fig. 3 shows an alternative embodiment of the invention.

In the arrangement shown in Fig. 1, the armature 10 of a direct-current motor 1 is supplied on the Ward Leonard system from the armature 20 of a direct-current generator 2. The generator field winding 21 is supplied from an exciter 3 having armature 22, differential series field winding 23 and separately excited field winding 24. The field winding 24 can be energized in either sense by adjustment of the tappings on potentiometer 25 which is connected across a main exciter 4 having armature 26, series field winding 27 and shunt field winding 28. This main exciter 4 is normally operated at approximately constant voltage.

The field winding of motor 1 is divided into two equal sections 11 and 12 which are arranged as opposite arms of a bridge, the other two arms of which consist of resistors 13, 14. The resistance values of resistors 13 and 14 are equal to the resistances of winding sections 11 and 12.

Opposite corners A and B of the bridge 11—14 are supplied with a direct voltage derived from the main exciter 4 in series with an auxiliary exciter 5, which has an armature 30, a separately excited field winding 31 and a differential series field winding 32, and is designed to give quick response to field changes. The field winding 31 can be variably energized in either sense from the tappings of potentiometer 33 which is connected across the main exciter 4.

The armatures 22, 26 and 30 of the exciters are all coupled to a motor 40 which runs at constant or nearly constant speed.

A rectifier 35, which may be of the metal plate type, is directly connected across the other opposite corners C and D of the bridge 11—14. As the resistances in this bridge are balanced, there is no voltage across the rectifier when the currents in the bridge are constant, and no current then flows through the rectifier.

When the currents through the bridge from corner A to corner B are increasing, the inductances of winding sections 11 and 12 limit the rates of rise of current through them, and current therefore flows through the rectifier from corner D to corner C. The potential of corner C is thus held close to that of corner D, with the result that the time constants exhibited by winding sections 11 and 12 are approximately the same as the normal time constants which they would exhibit if they were simply connected in series across a direct-current source instead of being connected in a bridge.

When the currents through the bridge are decreasing, however, the inductances of the winding sections 11 and 12 have the effect of decreasing the voltages across these winding sections. The potential of corner C therefore rises above that of corner D. Under these conditions the rectifier 35 is non-conductive, and this change of the potential distribution in the bridge is therefore not prevented. The temporary lowering of the voltages across the winding sections 11 and 12 has the effect of making more rapid the rate of decrease of current in those winding sections, which is therefore faster than that represented by the normal time constant which the winding sections 11 and 12 would exhibit if simply connected in series across a direct-current source. The time constants exhibited by winding sections 11 and 12 for decreasing current will actually be approximately halved.

In the foregoing consideration of the time constants exhibited by the field winding sections 11 and 12, the effect of the differentially compounded exciter in series has been ignored. This has actually the effect of making more rapid the rates of change of the currents in the field winding sections 11 and 12 whether these currents are increasing or decreasing; and thereby the ratio of the effective time constants for increasing and decreasing currents may be raised to 3½:1 or 4:1.

In the operation of the Ward Leonard system shown in Fig. 1, the speed of motor 1 is varied from zero up to, say, about half full speed in either sense by variation of the energization of exciter field winding 24.

For any motor speed within this range, the motor field winding is fully energized, the auxiliary exciter 5 having its field winding 31 so energized from potentiometer 33 as to give a small boost to the voltage of main exciter 4 as applied to the motor field winding bridge 11—14.

When about half full speed is reached, the output voltage from the armature 20 of the generator reaches full value. Further acceleration is obtained by weakening the motor field. For this purpose the tappings on potentiometer 33 are moved so as first to reduce the boost to zero and then to produce from the auxiliary exciter 5 a bucking voltage of gradually increasing value until, for full speed, the net voltage applied to the motor field winding bridge 11—14 is only about one-quarter of the voltage of the main exciter 4.

By virtue of the fact that the time constants exhibited by the winding sections 11 and 12 are lower when the field currents are decreasing than when they are increasing, acceleration can be rapid, and yet the rise of current will not be unduly great when the motor field is strengthened to give regenerative deceleration.

The potentiometers 25 and 33 are arranged so that their tappings may be moved in succession by a single controller (not shown). The use of a single main exciter 4 to control the excitation of the generator as well as to supply that of the motor has the advantage that, in the event of failure of this exciter, the generator field will not be maintained in the absence of motor field. If, on the other hand, the bucking exciter 5 should fail, the motor field would be maintained by the main exciter 4.

The arrangement shown in Fig. 2 is generally similar to that shown in Fig. 1. In the arrangement shown in Fig. 2, however, the generator exciter 3 and auxiliary motor exciter 5 both have additional separately excited field windings instead of their series field windings.

In Fig. 2, the field winding of generator 2 is divided into two equal sections 34 and 35 which are arranged as opposite arms of a bridge, the other two arms of which consist of resistors 36 and 37 having equal resistance values with the winding sections 34 and 35.

Opposite corners E and F of the bridge 34—37 are supplied with a direct voltage from exciter 3. The additional separately excited field winding 38 on exciter 3 is energized from the other opposite corners G and H of the bridge 34—37 through an adjustable resistor 39. As the resistances in the bridge 34—37 are balanced, there is no voltage across, nor current in, winding 38 when the currents in the bridge are constant.

When the potential of corner E is made more positive (or less negative) relative to corner F, for example by movement of the tappings on potentiometer 25, the potential of corner G becomes negative relative to corner H so long as the currents in the bridge are changing, and current therefore flows through winding 38 from corner H to corner G. The winding 38 is so connected that current in this sense changes the excitation of exciter 3 in such sense as to make corner E still more positive (or still less negative) relative to corner F. The rates of change of the currents in winding sections 34 and 35 are therefore made more rapid.

The winding 38 is similarly temporarily energized in the reverse sense when the potential of corner E is made less positive (or more negative) relative to corner F, and again therefore the rates of change of the currents are made more rapid.

The rates of increase and decrease of the currents in winding sections 34 and 35 can be adjusted very simply by merely varying the setting of variable resistance 39.

The motor field winding bridge 11—14 is energized from the main exciter 4 in series with auxiliary exciter 5 as in Fig. 1. The additional separately excited field winding 41 on auxiliary exciter 5 is connected in series with a variable resistance 42 across corners C, D of the bridge 11—14, in parallel with rectifier 35.

When the currents through the bridge 11—14 are increasing and current is flowing from corner D to corner C through rectifier 35, the voltage between these corners is negligible, and the energization of winding 41 is therefore negligible. The rates of increase of current through winding sections 11 and 12 therefore approximately correspond to the normal time constants which these winding sections would exhibit if they were simply connected in series across a direct-current source instead of being connected in a bridge.

When currents through the bridge 11—14 are decreasing, however, the potential of corner C rises above that of corner D and current flows through winding 41. The sense in which this winding is connected is such that this current will increase the E. M. F. of exciter 5 in the sense bucking the voltage of exciter 4. Consequently, the rates of decrease of current through winding sections 11 and 12 will be made more rapid by the effect of winding 41. The degree of this effect is readily adjustable by varying the setting of resistor 42. Owing to the parameters of the various windings there is in practice a possibility of oscillation if the sum of the resistances of winding 41 and resistor 42 is made too low.

When the rates of change of the currents in the field windings of motor 1 and generator 2 are adjusted by varying the settings of potentiometers 39 and 42, these adjustments do not affect, for any given settings of potentiometers 25 and 33, the steady values of the voltages which are generated by exciters 3 and 5 when the currents in the field windings have become constant.

If the rectifier 35 were reversed in the bridge 11—14, the time constants exhibited by winding sections 11 and 12 for a sudden decrease of direct voltage between corners A and B would be approximately the same as they would exhibit if they were simply connected across a direct-current source instead of being connected in a bridge; while these time constants would be approximately halved for a sudden increase of direct voltage. Again the time constants for changes in either sense would be reduced if a differentially compounded series exciter 5 were used; whereas the time constant for increasing current would be reduced, without appreciably changing that for decreasing current, if an exciter were used having a field winding separately excited from corners C and D and connected in the sense to increase the voltage applied to corners A and B when the potential of point C fell below that of point D. Such arrangements are not applicable to produce the characteristics desired from the particular Ward Leonard sets which have been described, but they have other applications.

Fig. 3 shows an arrangement of the sectionalized inductive winding whereby it is possible, without the use of a field winding to control the direct voltage applied by a generator, to obtain a wider ratio than 2:1 between the time constants for rising and falling currents. To obtain a ratio approaching $n:1$, the inductive winding is divided into $n$ equal sections. Fig. 3 is drawn for $n=4$, and shows the winding divided into four equal sections 50, 51, 52, 53. These sections are connected into a network so that each is in a separate parallel path across the terminals P, Q. Each of these parallel paths is completed by resistors, the total resistance value of which is equal to the sum of the resistances of all the other winding sections. For example, of the resistors in series with winding section 51, resistor 54 has resistance value equal to that of winding section 50 and resistor 55 has resistance value equal to the sum of those of winding sections 52 and 53.

The end of winding section 50 is directly connected through a rectifier 56 to the beginning of winding section 51, and the end of winding section 51 through a rectifier 57 to the beginning of winding section 52, and so on.

When the direct voltage between terminals P and Q remains constant, and the currents in the parallel paths are constant, no voltages are established across the rectifiers and no currents flow through them.

When terminal P is suddenly made more positive (or less negative) relative to terminal Q, voltages are established across all the rectifiers, so long as the currents in the paths are changing, these voltages being in such sense that the rectifiers are non-conducting. As the resistance in each of the parallel paths is four times that of the winding section itself, the time constant exhibited by each winding section is then only approximately one-quarter of that which the winding sections would exhibit if they were all simply connected in series across a D. C. source.

When, however, terminal P is suddenly made less positive (or more negative) relative to terminal Q, the rectifiers all become conductive so long as the currents are changing, and the time constants exhibited by the winding sections are then approximately equal to those which they would exhibit if they were all simply connected in series across a D. C. source.

In order to obtain some means for adjustment of the time constants, if required, a variable resistance may be included in series with the whole network. This will lower the time constants both for rising and for falling currents. Alternatively, or in addition, a variable resistance may be connected in series with each rectifier, with the effect of lowering only the higher of the time constants, i. e., that which obtains when the rectifiers are conducting.

Some of the arrangements herein described embody not only features claimed in this application, but also features claimed in application.

The foregoing disclosure and the showings made in the drawing are merely illustrative of the principles of this invention and are not to be interpreted in a limiting sense. The only limitations are to be determined from the scope of the appended claims.

I claim as my invention:

1. A network comprising $n$ parallel paths, each containing one of $n$ equal sections into which an inductive winding is divided, and each being completed by resistors to the total value of $(n-1)$ times the resistance of each winding section, the network also comprising $(n-1)$ rectifiers each connected in the same sense substantially directly from the end of the winding section in one path to the beginning of the winding section in another path, the arrangement being such that when a constant direct voltage is applied to said network and the currents therein are constant, there is no voltage across and no current through any of the rectifiers.

2. A bridge comprising an inductive winding divided into two equal sections arranged as one pair of opposite arms, a pair of resistors each having resistance equal to that of a winding section arranged as the other pair of opposite arms, a rectifier connected substantially directly between one pair of opposite corners of the bridge, and means to change a direct voltage applied between the other pair of corners.

3. A bridge according to claim 2 wherein the means to change the direct voltage applied between the said other pair of corners of the bridge includes a direct-current generator having a field winding which is excited in accordance with the voltage between that pair of corners between which the rectifier is connected.

4. A direct-current motor having its field winding connected as the inductive winding in a bridge according to claim 2, the arrangement being such that the rectifier will be conductive when the currents in the field winding sections are increasing but non-conductive when these currents are decreasing.

5. A Ward Leonard system comprising a direct-current generator and a direct-current motor, each having its field winding divided into two equal sections arranged as one pair of opposite arms of a bridge, each bridge being completed by two resistors having resistance values equal to those of the winding sections of that bridge, a generator exciter feeding the generator field bridge at one pair of opposite corners and having an exciter field winding connected across its other pair of corners in such sense as to increase the exciter E. M. F. when the currents in the generator field sections are increasing and to decrease the exciter E. M. F. when these currents are decreasing, a main exciter and a bucking exciter in series feeding the motor field bridge at one pair of opposite corners, the bucking exciter having a field winding connected across the other pair of corners of the motor field bridge in such sense as to increase in the bucking sense the E. M. F. of the exciter when the currents in the motor field sections are decreasing, and a rectifier connected substantially directly across said other pair of corners of the motor field bridge in such sense as to conduct when the currents in the motor field sections are increasing.

6. A Ward Leonard system according to claim 5 wherein the generator exciter and the bucking exciter are provided with further exciter field windings each arranged to be adjustably excited from the main exciter to vary the speed of rotation of the motor.

7. A system of control for a direct current motor having a field winding comprised of at least two equal sections and having an armature winding comprising, in combination, means for connecting a supply of direct current to said armature winding, a bridge circuit including said equal sections of said field winding as opposite legs and including resistors equal in resistance to the resistance of said equal sections of said field winding as the two remaining opposite legs, a rectifier connected across a pair of corners of said bridge circuit so as to conduct current when the currents of said equal sections of said field winding are increasing, an exciter connected across the remaining pair of corners of said bridge circuit, a field winding for said exciter, and circuit means connecting said field winding for said exciter across said rectifier in a sense to produce a bucking E. M. F. in said exciter when the currents in said equal sections of the field winding for said motor are decreasing.

8. A system of control for a direct current motor having a field winding comprised of at least two equal sections and having an armature winding comprising, in combination, means for connecting a supply of direct current to said armature winding, a bridge circuit including said equal sections of said field winding as opposite legs and including resistors equal in resistance to the resistance of said equal sections of said field winding as the two remaining opposite legs, a rectifier connected across a pair of corners of said bridge circuit so as to conduct current when the currents of said equal sections of said field winding are increasing, a main exciter, an auxiliary exciter having a separately excited field winding, circuit means connecting said main and auxiliary exciters in series across the remaining pair of corners of said bridge circuit, and circuit means connecting said separately excited field winding across said rectifier in a sense to produce a bucking E. M. F. in said auxiliary exciter when the currents in said equal sections of the field winding for said motor are decreasing.

9. In a variable voltage drive including a generator having an armature winding and a field winding, a motor having an armature winding and a pair of equal field winding sections in which, the armature winding of the motor is connected in series with the armature winding of the generator, the combination of, a bridge circuit including said equal field winding sections as opposite legs and including resistors equal in resistance to the resistance of said equal field winding sections as the two remaining opposite legs, a rectifier connected across a pair of corners of said bridge circuit so as to conduct current when the currents of said equal field winding sections are increasing, a main exciter, an auxiliary exciter, circuit means connecting said main and auxiliary exciters in series across the remaining pair of corners of said bridge circuit, a field winding for said auxiliary exciter, control circuit means responsive to the electrical output of said main exciter for exciting said field winding for said auxiliary exciter, and circuit means responsive to the electrical output of said main exciter for exciting said field winding for said generator.

10. Apparatus as set forth in claim 9 in which said last named circuit means comprises a second auxiliary exciter having an armature winding and a field winding in which said field winding for said second auxiliary exciter is energized by said main exciter and said armature winding for said second auxiliary exciter is connected across said field winding for said generator.

11. Apparatus as set forth in claim 9 in which said control circuit means comprises a potentiometer connected across said main exciter.

12. A Ward Leonard system comprising a direct current generator and a direct current motor, each having its field winding divided into two equal sections arranged as one pair of opposite arms of a bridge, each bridge being completed by two resistors having resistance values equal to those of the winding sections of that bridge, a generator exciter feeding the generator field bridge at one pair of opposite corners and having a pair of field windings, circuit means connecting one of said field windings for said generator exciter across the other pair of opposite corners of the generator field bridge in such sense as to increase the generator exciter E. M. F. when the currents in the generator field sections are increasing and to decrease the exciter E. M. F. when these currents are decreasing, a main exciter and a bucking exciter connected in series across one pair of opposite corners of the motor field bridge, the bucking exciter having a field winding connected across the other pair of opposite corners of the motor field bridge in such sense as to increase in the bucking sense the E. M. F. of the exciter when the currents in the motor field sections are decreasing, a rectifier connected substantially directly across said other pair of opposite corners of said motor field bridge in such sense as to conduct when the currents in the motor field sections are increasing, and circuit means for reversibly exciting the remaining one of said pair of field windings for said generator exciter from said main exciter to reverse the rotation of said motor.

NORMAN HARRY SHAW.

REFERENCES CITED

The following references are of record in the file of this patent:

UNITED STATES PATENTS

| Number | Name | Date |
|---|---|---|
| 786,418 | Cutler | Apr. 4, 1905 |
| 2,301,689 | Edwards et al. | Nov. 10, 1942 |
| 2,363,321 | Harding et al. | Nov. 21, 1944 |
| 2,395,515 | Stroller | Feb. 26, 1946 |
| 2,406,424 | King | Aug. 27, 1946 |